US008482250B2

(12) United States Patent
Soar

(10) Patent No.: US 8,482,250 B2
(45) Date of Patent: Jul. 9, 2013

(54) INDUCTIVE TRANSMISSION OF POWER AND DATA THROUGH CERAMIC ARMOR PANELS

(75) Inventor: Roger J. Soar, Kelowna (CA)

(73) Assignee: Cynetic Designs Ltd., Kelowna (CA)

(*) Notice: Subject to any disclaimer, the term of this patent is extended or adjusted under 35 U.S.C. 154(b) by 114 days.

(21) Appl. No.: 13/137,228

(22) Filed: Jul. 29, 2011

(65) Prior Publication Data

US 2012/0032632 A1    Feb. 9, 2012

Related U.S. Application Data

(60) Provisional application No. 61/344,500, filed on Aug. 6, 2010.

(51) Int. Cl.
*H02J 7/00* (2006.01)
*H02J 7/14* (2006.01)

(52) U.S. Cl.
USPC ............................ 320/109; 320/104; 320/108

(58) Field of Classification Search
CPC ....................................................... Y02T 90/14
USPC ........................................................... 320/109
See application file for complete search history.

(56) References Cited

U.S. PATENT DOCUMENTS

2010/0117596 A1* 5/2010 Cook et al. .................... 320/108
2011/0163542 A1* 7/2011 Farkas ............................. 290/2

* cited by examiner

*Primary Examiner* — Edward Tso
*Assistant Examiner* — Ahmed Omar
(74) *Attorney, Agent, or Firm* — Antony C. Edwards

(57) ABSTRACT

A system for the inductive transmission of power and data through large caliber ballistic appliqué composite armor panels mountable to military vehicle includes a large caliber ballistic appliqué composite armor panel and a quick-release base mounted to the outer face of the panel and a primary coil mounted to the inner face of the panel so as to be opposite to and aligned with the base; and, a portable electrical device having a secondary coil mounted in its base end, and wherein the armor thickness is no greater than substantially the range of 30 to 50 percent of the diameter of the secondary coil. The base end of the portable electrical device is adapted to releasably mount onto the quick release base for power transfer to the electrical device and for data transfer between the primary coil and the secondary coil by inductive coupling between the primary and secondary coils.

37 Claims, 8 Drawing Sheets

INDUCTIVE TRANSMISSION OF POWER AND DATA THROUGH CERAMIC ARMOR PANELS

CROSS REFERENCE TO RELATED APPLICATION

This application claims priority from U.S. Provisional Patent Application No. 61/344,500 filed Aug. 6, 2010 entitled Inductive Transmission of Power and Data Through Ceramic Armor Panels.

FIELD OF THE INVENTION

This invention relates to the field of power and data transmission under battlefield conditions and in particular to the inductive transmission of power and data through ceramic armor panels on military vehicles for the wireless transmission of power from the military vehicle to portable electronic devices and for the simultaneous wireless transmission of data between the military vehicle and the portable electronic devices without the broadcast of an RF signal.

BACKGROUND OF THE INVENTION

It is desirable to pass medium electrical power (less than 125 watts) and high electrical power (greater than 125 watts) electrical power and data inductively through vehicle, vessel and aircraft composite armor or personal body armor without the need to drill or core holes or otherwise provide via through the armor. The elimination of through holes or vias in armor increases the survivability the armor provides to both the vehicle itself and of its occupants, and allows placement of electrical and electronic devices on both a planned and adhoc basis on the exterior or threat side of the vehicles protective armor.

Inductively coupled power and data transmission allows the placement of electrical devices of all types such as those that require power only, i.e. signal or driving lights, electrical actuators or controllers to control ancillary devices such as flare launchers, battery charging stations for dismounted soldiers or any device that could be placed on the outside of a vehicle that requires only a switched AC or DC voltage power source to operate. The second type of device that can be powered inductively through armor would be those that require both power and data transmission. This would include devices such as those used for voice or data communications, cameras, and sensors.

As composite ceramic armor has no or very low magnetic properties, the passage of inductive power which uses magnetic flux to couple the primary and secondary sides of the inductively coupled transformer circuit can be done with relative efficiency. In turn the magnetic flux that passes through the armor has no negative effect on the performance of the armor and operates in the presence of water, mud, etc.

This disclosure relates to inductively coupled power and data transmission which is also known as wireless, contactless energy or power transmission or wireless or contactless of near field communication data transmission among other terms.

There are many configurations of armored vehicles used to support military operations such as Infantry Fighting Vehicles (IFV), Armored Personnel Carriers (APC), Light Armored Vehicles (LAV), battle or light tanks, transport trucks and multi-function vehicles such as the High Mobility Multipurpose Wheeled Vehicle (HMMWV) that require protective armor. In addition there are many aircraft and marine vessels that are equipped with armor. The armor can be comprised of various metals from aluminum, titanium or high hardness steels, composite-ceramic panels or a combination of composite-ceramic strike face on a metal vehicle hull. A typical illustrative example would be the composite-ceramic armor used by Light Armored Vehicles or LAV's.

Composite-ceramic vehicle armor can be designed as an integral part of the original wheeled vehicle or as a bolt on 'up-armor' component. In the US Military, Stryker, ASV, and JLTV modular and bolt-on armor are examples of programs for this type of armor. The Stryker's hull is constructed from high-hardness steel which offers a basic level of protection against 14.5 mm rounds on the frontal arc, and all-around protection against 7.62 mm ball ammunition. In addition to this, Strykers are also equipped with bolt-on ceramic armor which offers all-around protection against 14.5 mm, armor-piercing ammunition, and artillery fragments. The Bradley fighting vehicle is similar in that add-on composite-ceramic armor is appliquéd on top of the steel hull.

Composite-ceramic panels can also be placed over light skinned vehicle bodies such as the HMMWV, aircraft of all types (wing and rotary) and may be used as part of the vehicle structure. The US Army recently unveiled its new lightweight, all-composite truck cab. The cab was designed for the U.S. Army's tactical wheeled vehicle fleet and addresses serious vehicle issues by being lighter in weight, highly durable, and strong enough to carry the heaviest of armor and mine blast protection. The all-composite cab allows soldiers to carry more protective armor, ammunition, and equipment because it weighs hundreds of pounds less than cabs constructed with conventional heavy armor materials and therefore reduces the baseline burden on vehicle axles.

The ceramic strike face is usually placed on the composite structure or panel in a tiled matrix and then cut to shape. Typical ceramic used in conjunction with composite backing to form an armor system include: $Al_2O_3$ (Aluminum Oxide or Alumina); SiC (Silicon Carbide); $Si_3N_4$ (Silicon Nitride); and, $B_4C$ (Boron Carbide).

Composite materials can some times be used by themselves as vehicle armor or be a part of a composite-ceramic armor system where they are used to provide support and mechanical structure and integrity to the ceramic tiles. Typical composites used are UHMWP or Ultra High Molecular Weight Polyethylene. Examples of this family of product would be Tensylon (™ BEA), Dyneema (™ DSM) or Spectra Shield (™ Honeywell). Para-Aramids and resin where the aramid would typically be a variety of weaves of Kevlar (™ DuPont), Twaron (™ Teijin), Technora (™ Teijin) or unidirectional laminates such as T-Flex (™ Armorworks LLC).

Many different types of resin such as but not limited too phenolic, polyester or urethanes are used to bond these fibers into a solid composite panels.

One other type of non-metallic armor that could also have applications for inductive power and data transmission is transparent armor. Transparent armor is usually found in vehicles as windshields or side glass and provide the occupants with ballistic protection and visibility. They are usually constructed as multi-layer laminates of polycarbonate plastics and glass.

PRIOR ART PUBLICATIONS

1. Standard ECMA-340, Near Field Communication Interface and Protocol-1 (NFCIP-1), 2nd Edition December 2004
2. Standard ECMA-352, Near Field Communication Interface and Protocol-2 (NFCIP-2), 2nd Edition June 2010

3. Standard ECMA-386 Cryptographic Standard Cryptography Standard using ECDH and AES (NFC-SEC-01) 2nd Edition, June 2010
4. H.264/MPEG-4 Audio Video Conversion, Wikipedia
5. Specification "Qi Compliant Wireless Power Transmitter Manager bq500110", Texas Instruments Inc, Dallas, Tex. Publication: SLUSAE0A November 2010, Revised April 2011
6. Specification "Wireless Receiver-Side Communication and Power Monitoring IC for Wireless Power MSP430BQ1010", Texas Instruments Inc, Dallas, Tex. Publication: SLAS696, December 2010
7. PN5331B3HN, Near Field Communication (NFC) Controller. Document #157531, Rev 3.1, NXP B.V., Dec. 10, 2008
8. AN10682-2 PN533 Application Note, Rev.1.3, NXP B.V. Nov. 14, 2008

PATENTS AND PATENT APPLICATIONS

1. U.S. Pat. No. 7,863,859 issued Jan. 4, 2011 to Soar, entitled Contactless Wireless Battery Charging Apparel
2. U.S. Pub No. US-2011-0089894-A1 for the application of Soar, application Ser. No. 12/926,858 published Apr. 21, 2011 entitled Contactless Wireless Battery Charging Apparel
3. U.S. Pub No. US-2009-0218884 for the application of Soar, application Ser. No. 11/922,788 published Sep. 3, 2009 entitled Contactless Wireless Battery Charging Apparel

| 4. | 7,254,366 B2 | August 2007 | Palermo |
| 5. | 7,408,324 B2 | August 2008 | Baarman |
| 6. | 7,149,552 B2 | December 2006 | Lair |
| 7. | 7,076,206 B2 | July 2006 | Elferich |
| 8. | 6,924,619 B2 | August 2005 | Dvorak |
| 9. | 2006/0224048 A1 | October 2006 | Devaul |
| 10. | 7,805,767 B2 | October 2010 | McElroy |
| 11. | 7,657,255 B2 | February 2010 | Abel |
| 12. | 7,254,366 B2 | August 2007 | Palermo |
| 13. | 7,149,552 B2 | December 2006 | Lair |
| 14. | 200810129215 | Jun. 5, 2008 | Boys |

SUMMARY OF THE INVENTION

This invention provides for the synergistic application of multiple technologies that when combined provide a unique capability previously not envisioned using the opportunity afforded by many current military vehicle designs, including those on wheeled or tracked vehicles, watercraft and aircraft. That capability is the ability to pass wireless power and data including high definition video, through large caliber ballistic appliqué armor panels typical of that found on a tank or armored personnel carrier, without making a hole in the armor that could potentially compromise the armor effectiveness and reduce its survivability during an attack on the vehicle. As compared to the power restrictions on a personnel-carried body armor system with inductive charging and data transmission wherein the user has to carry the central power supply, the opportunity on a military vehicle provides relatively unlimited power as compared to which has to be carried, thereby allowing the use of much larger power and data transmission coils, which require the higher power, and which offset the loss of efficiency which occurs when inductively coupling through the thick armor found on vehicles, which is thick as compared to the relatively small stand-off distances used in my body armor systems, which are the subject of the above mentioned published patent applications, to maintain relatively high efficiency to reduce the power requirements of the power and data transmission system in the body armor.

By taking advantage of the ability of inductively coupled devices employing magnetic flux to penetrate non-magnetic, non-conductive materials such as the composites and ceramics used in construction of many appliqué armor panel systems, a transparent interface is created that transmits wireless electrical power and data to electronic devices mounted on the outside of an armored vehicle. An optional universal quick release base on the outside of the vehicle allows for rapid replacement or exchange of one portable electronic device for another without the use of tools or having to connect cables, the device instantly receiving power and being able to communicate with the vehicles data system. The completely sealed system allows operation in all environmental conditions including being fully submersed and remaining operational while under water.

With a secondary inductive coil and associated electronics integrated into for example a four to eight inch diameter base end of a portable electronic device, ie, where the secondary coils are four to eight inches in diameter, the secondary inductive coils can usefully receive power through armor thicknesses up to 35-40 percent of the coils' diameter, ie, for example up to through approximately three and one quarter inch armor thickness when the base end of the electronic device is mounted in the quick release base on the outside of the armor panel. In applicant's opinion beyond substantially 50 percent of the coil diameter, although power can still be received, coupling losses (which applicant believes may increase in the order of at least the square of the armor thickness) become too great for useful power transfer. The larger the diameter of the coil for a given thickness of armor, the more efficient the power transfer will be. Any power transmission losses created by the wireless system when powering an external device are trivial in comparison to the ample power available from the vehicle. As is typical of many secure military wireless data transmission requirements, the inductive data transmission signal is tightly contained within the magnetic field that passes through the armor panel to the external device and the data itself can be highly encrypted.

One aspect of the present invention involves the placement of two primary inductive circuits, one for the transmission of power the second for the transmission of data placed on the back side (composite side or inside surface) of a composite-ceramic armor panel. When the primary inductive power coil is driven by an AC voltage from the primary coil drive circuit, the alternating current in the coil induces a magnetic flux and allows the coil to inductively couple to a secondary coil or coils located on the front (ceramic or strike face) of the armor panel. Once an inductive connection is made between the primary and secondary power coils, a device that is connected to the secondary coil and its conditioning circuit will instantly start to receive power and be functional.

Inductive transmission of data is similar in that the primary and secondary inductive data coils can exchange (transmit and receive) data by modulating the transmitter and detecting the modulated inductive signal at the receiver. There are many methods of transferring data inductively or by using magnetic flux. One method of creating a secure inductive data link is to utilize Near Field Communication (NFC) technology. The most significant advantage of alternating magnetic flux or inductive technology is that no holes need to be made through the non-metallic armor that would otherwise pass the conventional wired electrical power and data cable, thus enhancing the battlefield survivability the armor provides to the vehicle and occupants.

Inductive transmission of electrical power and data through composite-ceramic or composite armor would for the most part be applied to a light armor with a thickness of less than three inches (7.5 cm) however, it can be used on armor systems which are thicker.

It is envisioned that the primary power and data coils, which are placed on the back side of the armor would be remote (1 cm-1 m) from the primary coil power drive circuit and the data transmit/receive circuit. This is due to the small gap that usually exists between the bolt-on or appliqué composite-ceramic armor and the steel hull or vehicle body. The primary coils can be designed to be very thin i.e. less than 2 mm, however the drive circuits will have a higher profile that may dictate that they be located other than proximal to the primary coil such as inside the vehicle. If space or other requirements allow, the primary coil can have a thick (greater than 2 mm) dimension, be of different geometries such as cylindrical (but still concentric with the secondary coil) and with the primary drive electronics co-located with the primary coil. The primary coil can be applied flush with the flat back surface of the composite assembly or be placed into an inset in the composite that is created either at the time the composite is manufactured or at a later date.

Many types of devices can be powered on the outside of the armor. Although it is expected that most external devices will have a power draw of less than 200 watts, the inductive power system can be designed to provide power of up to, for example a kilowatt as would be known to one skilled in the art. The device to which power is provided may have a mounting surface that is used to attach it to the armor's exterior surface. The secondary coils for power and data along with associated rectification and power and data conditioning electronics can be placed in and around the device's mounting system. The device mounting system is designed such that the secondary coil is located as close to the mounting surface as possible and on the same axis as the primary coil to provide the highest inductive coupling efficiency (FIG. 2).

In addition to inductive power, externally mounted devices can also be provided with inductive data transmission capabilities. This enables the vehicle systems to power sensor arrays, cameras or devices that collect or are made functional through the transmission of data back into the vehicle through communication systems such as CANBUS, LINBUS.

Example devices that could receive inductive power and inductively receive and transmit data include, but are not limited too:

vehicle driving lights including headlights, fog lights, turn, brake, reverse and running light using either LED or Incandescent technology spotlights, visible and infra-red wavelengths devices requiring activation through electro-mechanical actuators that can turn a device on or off, adjust it, or move it; or relays: signals such as smoke and flare launchers devices with integrated internal rechargeable batteries that provide peak pulsed power to the device munitions such as mortars still or video cameras including daylight video, thermal or Infra-red intercoms or communication systems NBC sensors charging system for dismounted soldier main power batteries vehicle armor health monitoring reactive armor triggering and monitoring dynamic or adaptive camouflage external auxiliary power requirements A through-armor power and data transmission capability eliminates the need for holes or vias to be placed in armor panels through which to run power and data cables to external electrical devices on the vehicle, aircraft or vessel. For those devices placed near the edge of an armor panel that would otherwise allow the cable to be wrapped around the edge of the panel, it would also serve to place all cable behind the protective armor panel.

The integration of the secondary coil power and data coils into the device allows the device to be completely sealed with the only interface requirements being alignment with a primary coil and mechanical attachment to the armor panel.

Additional benefits include:

no connector or cables are required to pass through the armor panel to power and communicate with a device on the exterior of the armor panel a device can be completely sealed and made environmental proof with no external connections when using inductive power and data transmission. As the device is completely sealed from the environment it can be fully submerged and remain functional. It is also unaffected by sand, dirt, snow and POL's (petroleum's, oils and lubricants).

If a device attached to the armor panel is no longer needed, it can be easily removed as no physical disconnections have to be made versus one with wiring.

With a universal design quick attach, twist lock mounting fixture, the same mounting location can be used for a different device or be left unused; for example, a light may be swapped out for a sensor As inductive power and data transmission uses magnetic flux (inductive coupling) for communication with devices, the devices are unaffected by radio jamming technologies used to defend against RF initiated IED's In an alternate configuration, where circumstance allows a power or, power and data cable to be brought to the strike side of an armor panel, a primary inductive power and data assembly can be embedded within a mounting fixture such as a twist lock mounting fixture attached to the strike face of the armor, allowing various devices to be rapidly attached and replaced as required. All the benefits of inductive power and data transfer as previously discussed apply to this design configuration.

In summary, the system according to one aspect of the invention for the inductive transmission of power and data through large caliber ballistic appliqué composite armor panels mountable to military vehicles may be characterized as including: (a) a large caliber ballistic appliqué composite armor panel having opposite inner and outer faces defining an armor thickness therebetween, wherein, when the panel is mounted to the vehicle, the inner face is disposed towards the vehicle and the outer face is disposed outwards of the vehicle, and wherein a quick-release base is mounted to the outer face, and a primary coil is mounted to the inner face so as to be opposite to and aligned with the base; and, (b) a portable electrical device having a base end, wherein a secondary coil is mounted in the base end, the secondary primary and coils having an equal diameter, and wherein the armor thickness is no greater than substantially 40 to 50 percent of the diameter.

The base end of the portable electrical device is adapted to releasably mount onto the quick release base for power transfer to the electrical device and for data transfer between the primary coil and the secondary coil by inductive coupling between the primary and secondary coils. Primary and secondary circuitry associated with the primary and secondary coils is mounted, respectively, so as to cooperate with the primary and secondary coils.

The power is supplied by an electrical system of the vehicle and the data is transferred between the electrical device and the vehicle via the inductive coupling.

In one embodiment each primary coil is a single coil for both the transfer of power and data. In another embodiment each primary coil is a pair of coils, wherein one coil of the pair is for the transfer of power and the other coil of the pair is for the transfer of data at a high data rate.

In a further embodiment a plurality of the primary coils are distributed over the inner face of the panel and wherein each primary coil is electrically connected in cooperation with the primary circuitry.

Advantageously the quick release base is adapted and sized to snugly receive the base end of the electrical device therein for secure positioning of the secondary coil in an inductively coupling position aligned with the primary coil.

The primary coil may have a diameter which is substantially the same as the diameter of the secondary coil. Each primary coil may include power and data nodes. Where there are a plurality of primary coils, a corresponding plurality of quick release bases may be correspondingly mounted on the outer surface of the armor panel.

The system may advantageously further include a vehicle power supply from the vehicle, wherein the vehicle power supply is in electrical connection to the primary circuitry.

Further advantageously the system may further include a network, which network includes the vehicle power supply on the vehicle, wherein the primary circuitry has a hard-wired connection to the network for the exchange of power and data between the primary circuitry and the network.

In one embodiment one or more of the electrical devices has its own re-chargeable power supply which is charged by the inductive transfer of power. Further a proximity sensor may be provided in the quick release base to detect proximity of the electrical device in the base.

Each electrical device may provide a modulated signal via the inductive coupling of the primary and secondary coils for the transfer of data. The signal may be transmitted via a modulated signal inductively transmitted through an inductively coupled power coupling of the primary and secondary coils, or may be transmitted via a modulated signal inductively transmitted through an inductively coupled data coupling of the primary and secondary coils for example for data transfer at a high data rate as better described below.

DETAILED DESCRIPTION OF EMBODIMENTS OF THE INVENTION

Figure 1:
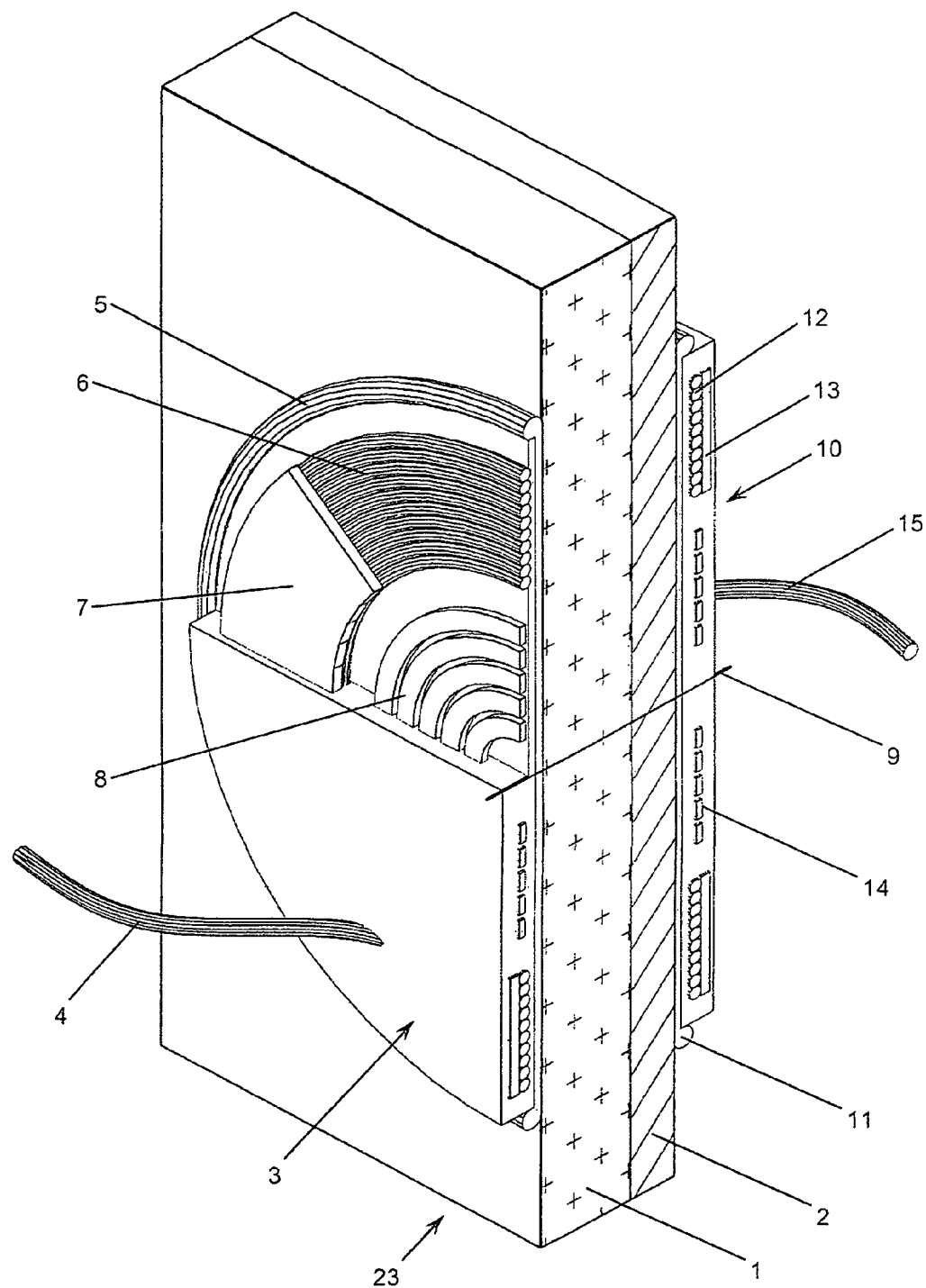
FIG. 1 is an illustration of the relative location and basic construction of the primary and secondary coils on a composite-ceramic armor panel to allow inductive power and data transfer through the panel. The primary coil would be embedded within an environmentally protective housing, or case and the secondary coil within the device to be inductively powered. Both the coils and ferrite backing can have different geometries as illustrated in FIGS. 3A-3H.

Power Drive Electronics and Coil Configuration
Primary and Secondary Electronics The fundamental power transfer circuit technology employed in this device is an LC resonant tank circuit that is inductively coupled to a secondary coil and associated circuits within a remote device and which together with the primary coil forms an air core transformer. The required primary circuit electronics are comprised of both control and inductive resonant circuits. The primary side would typically include but not be limited to a frequency generating or oscillator circuit, power switching driver(s) such as a MOSFET full or half bridge driver that in turn would power the LC resonant tank circuit placing a current through the coil and with a feedback loop to maintain optimal resonant frequencies. Base power for the primary circuit would be provided from the main electrical power bus of the vehicle, aircraft or vessel.

The primary circuit may be tuned to a single frequency i.e 200 kHz or be an auto tune circuit that maintains resonance over a small range of frequencies as external factors dictate. Many iterations or architectures of this circuit can be constructed depending on the needs identified or specific design requirements that accommodate different frequencies, impedance, inductance and capacitance of the major components. The resonant frequency of this device would typically be selected for within the range of 100-500 kHz, but certain applications may require operation up into the 10's of MHz. The resonant characteristics of the tank circuit for a given frequency will change as the armor thickness or primary and secondary coil distance is changed (due to the mutual inductance of the two coils changing, which in turn changes the apparent inductance of the primary coil and so changes the resonant frequency of the tank circuit). Therefore the inductive resonant circuit could be tuned to an armor thickness and type so as to obtain optimal performance. The collective tuning of frequency, impedance and inductance etc could be done once for a given armor thickness or type, or could it be performed by a tank circuit auto-tune sub-circuit integral to the primary coil drive.

The primary drive circuit maybe co-located with the primary coil assembly, however the primary circuit would typically be located at an alternate exterior location or within the vehicle with a shielded cable connecting the primary coil assembly to the drive circuit. A conventional control panel, dashboard switch, or electronic relay can be used to switch DC power to the main drive circuit.

The primary drive circuit may be completely switched on all at once, or can utilize a very low power proximity sensing sub-circuit. The sensing circuit in conjunction with for example a hall effect detector located within the primary coil, would allow for more energy efficient operation by reducing unnecessary use of vehicle power. When the primary circuit receives power from the vehicle electrical system, only the proximity circuit would be energized with the primary drive circuit not turning on until a device was attached and sensed on the outside of the armor panel. The proximity detector embedded within the primary would sense an appropriate device and then energize the main drive tank circuit.

Other options for turning on the drive circuit include various inductive polling procedures such as resistive modulation or capacitive modulation techniques by the primary to detect the presence of a device with an appropriate receive transmit sub-circuit within the secondary circuit.

Instead of a hardware device being used as the secondary circuit proximity detector the primary circuit can be used to 'ping' for the secondary circuit. Again many options are available but one is that the auto tune circuit looks for a change in the inductance of primary coil. As the secondary coil is brought into proximity, its mutual inductance as it couples with the primary coil changes the inductance of the primary coil. This can be detected by the auto-tune circuit of the primary coil. A second example is that the primary coil data circuit would 'ping' on a regular basis and waits for a data response back from the secondary circuit. One method of implementing this process has been described by Texas Instruments Inc, in their inductive charging IC specification referred to above, wherein they state: "There are two ways the coupled electromagnetic field can be manipulated to achieve information transfer from the secondary side to the primary side. With resistive modulation approach, the communication resistor periodically loads the rectifier output changing the system Q factor and as a result value of the voltage on the primary side coil. With capacitive modulation approach, a pair of communication capacitors are periodically connected to the receiver coil network. These extra capacitance application changes slightly the resonance frequency of the system and its response on the current operating frequency, which in turn leads to coil voltage variation on the primary side. With both modulation techniques primary side coil voltage variations are detected with demodulation circuit and further interpreted to restore the content of the information packets and adjust controls to the transmitter schematic."

The secondary circuit would be co-located with the secondary charging coil within the target device to be powered and would provide rectification of the AC power signal, voltage regulation as required, and power to load which could be any electrical or electronics device as previously described. Rectification, the conversion of received AC power signal to a DC power signal can be by diode bridge, synchronous rectification techniques or other means. If required the device can also contain a rechargeable battery and battery charging circuit that would receive power from the inductive power circuit.

Coil Design

The primary coil most likely be of a low profile design (i.e. less than 2 mm thick) to allow it to be easily fitted between an armor panel and the vehicle hull or body. The coil can be made in many conventional configurations appropriate for inductive coupled devices or even new designs that still allow inductive coupling for the purpose of power and data transfer. Existing coils can be wire wound using conventional enameled copper magnet wire, multi-filament Litz wire, coil designs etched into single, double sided or multi-layer printed circuit boards, single, double sided or multi-layer flexible substrates such as Mylar™ or Kapton™ etc and be of any geometric shape. Coils with a Q-factor from very low to greater than 100 can be used as the coil orientation is primarily fixed and therefore can accommodate a variety of coil designs and 'Q'. The higher the Q however, the better coupled the coils and overall system efficiency will be higher or more optimized.

To aid in optimizing the efficiency of the inductive wireless power transfer between the primary and secondary coils, different shapes and thickness of ferrite backing can be employed to manipulate the shape of the magnet field. The ferrite can be of a simple planar design or utilize more complex geometries to accommodate both the primary and secondary coils (FIGS. 3A-3H and FIGS. 4A, 4B). The ferrite could be of conventional ceramic or a flexible polymer based ferrite. In some circumstances the use of primary and secondary co-axial coils with a cylindrical design maybe advantageous.

As mentioned earlier the primary and secondary circuits could employ a device or proximity detection circuit or utilize a polling technique to sense the presence of the secondary coil and connected device. Proximity sensing could be performed in many ways including inductive, capacitive, hall effect, so that primary drive circuit is not activated when turned on at the main power switch unless a device is present. One proximity device example would be that a magnet of suitable strength can be place within the secondary coil so that a hall effect sensor within the primary coil is activated when the device is placed in a position allowing it to inductively couple with the primary coil. When the hall effect sensor within the primary coil assembly is activated the main drive circuit is allowed to be switched on.

The primary coil would be fully encapsulated in plastic to make it fully environmental proof and ruggedized and to provide a surface with which to mount it to the armor panel. The secondary coil would also be encased in plastic as part of the device to be powered. The secondary coil and device would also be completely ruggedized and environmental proof.

Inductive Data Transfer

Magnetic flux or inductive data transmission offers the advantage that it can perform short range data exchange without a wired or physical connection. Inductive coupling has excellent material penetration capabilities. It can penetrate non-magnetic materials such as air, water, ceramics, composites and plastics including traditional composite-ceramic armor panels. As with inductive power, no exposed electrical contacts are required for inductive data transfer allowing the primary side of the inductive circuits that would be co-located with the primary power coils on the back side of the armor panel to be fully encapsulated and environmentally ruggedized. With the inductive secondary data circuit contained within the remote attached device, the device can now be semi-permanently sealed and ruggedized as data and power cable is not required. It also allows the inductive power and data transfer enabled devices be fully submersed in water, and be impervious to exposure to ice, snow, mud, dust, dirt, sand, etc as well as battlefield petroleum, oils and lubricants (POL's).

Inductive data transmit and receive coils separated by an air or non conductive, non magnetic gap may be thought of as a weakly-coupled transformer, across which encoded data may be transmitted by modulating the source (or transmitter) and detecting the modulated signal at the receiver. There are a multitude of electronic devices that can be powered inductively that require either directional or bi-directional transmission of data or coded signals. For example a light could have four 'on' states that need to be switched, the interrogation of an NBC sensor that requires transmission and receiving of low rate data or communication with a high data rate device such as a video camera or thermal sight.

As a descriptive example, inductive data could be transmitted by an inductive coil and driver circuit when a microprocessor within the drive circuit sends data encoded for serial transmission to a data driver circuit that modulates the coil voltage across a tuned LC circuit. The modulated signal is transmitted by the primary side coil across the inductively coupled link to the secondary coil which generates an AC signal that is rectified and decoded back to serial data. The coil or antenna configuration for the transmission of inductive power and data can take many forms (FIGS. 5A-5E). Example simplified block schematics for the transmission of power and data are provided in FIGS. 6 and 7.

The inductive frequency of a single primary coil used for power transfer may also be modulated to provide data transfer to a single secondary power coil connected to a modulation decoding circuit.

Coils on each of the primary and secondary side of the inductively coupled circuit could be employed for both power and data transmission. On each side of the armor panel one inductively coupled coil pair would provide power transmission and the other inductively coupled coil pair would provide data transmission. The inductive coils used for power transmission may operate at a resonant frequency of 180 kHz while the inductive coils used for data transmission may operate at resonant frequency of 13.56 MHz.

One method of creating a secure inductive data link is to utilize Near Field Communication (NFC) technology which uses an inductive link to enable connectivity between electronic devices. NFC technology is a magnetic induction interface operating at a frequency of 13.56 MHz and with standardized commercial data rates up to 848 kbps and more recently 6.78 Mbits/s. The technology has been developed to transfer secure data on a peer to peer basis between two co-located cell phones, between cell phones and data terminals for retail sale transactions, or between cameras and other electronics such as TVs or media players.

Inductive data transfer as with inductive power transfer also employs vicinity inductive coupling within the near field. In practice, very low power levels utilized for inductive data transfer provide practical short range communication capability of up to 20 cm, which is considerably more than the thickest composite-ceramic armor panels.

NFC inductive data transmissions are half duplex as same center frequency is used for both transmit and receive. To prevent two devices transmitting at the same time, they operate in what is termed a listen before talk protocol. The devices may only transmit if they previously listen to check that no other devices are transmitting.

There are three principle manufacturers of NFC integrated circuits. Two of the companies Sony, (Japan) and Phillips which is now NXP (Austria and Netherlands) were the principle creators of the NFC technology. A third company, Inside Secure (France) has also created a line of IC's that are compliant with the Near Field Communication (NFC) standards.

The existing NFC standards and product utilize the principle of encoded ASK (amplitude shift keying) inductive load modulation that provides data transmission rates up to 848 Kbits/s. A second modulation technique using PSK (phase shift keying), which is currently unsupported by the NFC standard, allows data rates of up to 6.78 Mbit/s.

Many of the data requirements of externally mounted vehicle devices will be status or low data rate requirements that can easily be supported by a 848 Kbits/s data rate. The streaming of high resolution video from day time video cameras, night sights or thermal cameras will require Very High Data Rate (VHDR) NFC. A raw video data stream uses large amounts of data especially in full colour large format displays, for example a 320×240 pixel, 24 bit true color depth, 30 frames a second video requires a throughput of 13.8 Mbit/s or at 15 frames per second a data rate of 6.9 Mbit/s. Raw video data streaming is therefore not compatible with low data rate NFC technology. However with video compression algorithms, the data requirements fall into the top end of the existing low data rate NFC throughput and well within that of future VHDR NFC technology. As an example video compression suitable for wireless application could be either MPEG-4 or H.264. The H.264 video format has a very broad application range that covers all forms of digital compressed video from low bit-rate Internet streaming applications to HDTV broadcast and Digital Cinema applications with nearly lossless coding.

Applicable H.264 video data bit rate for three example camera resolutions in the High Profile mode would be: 320× 240 pixels@15 frames per sec requires 480 Kbits/sec; 352× 288 pixels @30 fps requires 2.5 MBits/s and, 780×480 pixels at 15 fps requires 5 MBits/s all data rates well within the 6.78 Mbit/s capability of VHDR NFC.

Many data receiver coils utilize a three dimensional antenna so that signal reception is always optimized for it to receive a signal via the magnetic flux coupling when the device is not aligned parallel to the primary coil. This technique is often used in RFID communication. For communication through an armor panel a 3D coil assembly may not be necessary as the alignment of the send and receive coils will be both high and predictable, suiting the use of a simpler 2D coil architecture such as that used with an inductive power transmission coil.

A standard NFC antenna can be a PCB loop, printed circuit on Mylar or ferrite rod antennas that are either active or passive and in many sizes and configurations to suit the enclosure they are placed within. As the position and alignment of a device on the outside of a vehicle and the secondary power and data circuits and antennas contained within them and the primary drive circuits will be reasonably precise, the antenna design for NFC data transmission will most often be of a 2D PCB design. If a physical offset is required between the primary and secondary data antennas then ferrite rod loop antenna operating in the axial radiation mode can be used. When appropriate planar ferrite structures can be used to manipulate the magnetic field of the NFC antenna and enhance coupling between the primary and secondary antennas or coils.

There are several intrinsic benefits to using inductive data transfer especially using the NFC format that make it appropriate for use in communicating with electronic devices external to the vehicle.

NFC communication protocols require the instant pairing of devices such that once they are brought within a very short range of each other such as less than 10 cm, they instantly pair without manual intervention. The moment an extra-vehicular device is placed on a mounting device or spot, it will automatically connect to the primary data coil on the back side of the armor.

The short range attributes of inductive or NFC makes it extremely difficult to intercept by someone trying to electronically eavesdrop as would easily be the case with short range communication using Bluetooth, Zigbee, WiFi or other radiating radio frequency technologies. When an NFC device is coupled to a primary circuit on the back side of an armor panel, the wireless connection can be considered to be very secure as the antennas are proximally intimate and will be magnetically tightly coupled. As further protection from eavesdropping two additional protective methods are available. The establishment of a secure channel over NFC can be done very easily, because the NFC link is not susceptible to a Man-in-the-Middle attack. Therefore, well known and easy to apply key agreement techniques without authentication can be used to provide a standard secure channel. This resistance against Man-in-the-Middle attacks makes NFC an ideal method for secure pairing of devices placed on the outside of a vehicle. Another standard that NFC IC's must adhere to is the ECMA-386 NFC-SEC-01 Cryptographic Standard which provides for the implementation of both 128 and 196 bit encryption using one of several specified methodologies. Encrypted data transmission is a very common requirement for military devices to ensure secure communication.

As inductive communication applies the principles of a modulating magnetic field, devices external to the vehicle would still be able to communicate through the composite-ceramic armor to the vehicle BUS system when the vehicle is creating or is subjected to RF jamming, where the RF jamming is being used to provide protection from the detonation of for example roadside IED's (Improvised Explosive Device) or for other tactical reasons.

Bump communication would allow for the exchange of information between two devices employing NFC pairing and communication protocols. A warfighter equipped with NFC enabled equipment would be able to approach a vehicle with an NFC enabled communication hotspot and by touching his device to the indicated spot on the vehicle and holding it in proximity for a period of time appropriate for the amount of data to be transferred could initiate an NFC data exchange even within an RF denied area without the use of connectors and cables. The devices, for example control and command computers, would have been configured to exchange position and command data with the vehicle. After entering an appropriate password, the device is brought into contact with the vehicle, an instant NFC handshake protocol is initiated and the devices exchange data magnetically without the need of cables, opening connectors or the transmission of RF data. As described earlier this type of data transfer is inherently secure.

Both the primary inductive power and data coil assembly and the device to which they are inductively coupled must be attached to the back side of the armor panel with respect to the primary coil assembly and the strike or face side of the armor for the device. As the armor panel cannot be compromised by mechanical fasteners requiring through holes, both of the primary coil assembly and the device would be attached to the panel using various bonding approaches.

The primary coil which would be encased in plastic, resin or other suitable material would present a suitable surface with which to bond the coil to the back composite surface of the panel. The bond can be permanent or semi-permanent. The primary coil can be mounted against the back panel so that it protrudes or is proud of the back surface, or be mounted into a recess within the panel that allows the panel to be mounted flush against the vehicle hull. A separate bonded mounting fixture could be also used that allows the primary coil to be easily installed or removed using for example a twist lock feature or threaded fasteners that locate the primary to the fixture.

A device to be powered with an embedded secondary coil, and related embedded circuits could also be directly bonded onto the exterior of the panel opposing (i.e. on the same axis) as the primary coil.

A further iteration would be the bonding of a bracket or mounting fixture with integrated primary inductive power and data drive circuits and coils to the exterior of the armor panel if circumstance allows a power and data cable from the vehicle to be routed to the strike face of the armor panel. A standardized or universal mounting bracket design using a twist lock feature or means of mechanical attachment would allow other devices to use the same mounting fixture. The electrical or electronic device which is completely self-contained with the secondary inductive power and data circuits is mounted onto the fixture which allows it to be easily and quickly installed or removed without connection of wires or cables. A benefit of an external mounted primary inductive drive assembly is that it can be mounted on a metal or conductive armor system such as aluminum or hardened steel without the metal armor affecting the inductive transmission properties between the primary and secondary inductive assemblies. All other inductive transmission benefits and advantages as previously described would still be retained Detailed Description with Reference to the Figures FIG. 1 details the general configuration of the primary and secondary power and data coil assemblies on a composite-ceramic armor panel 23 that is comprised of a composite armor panel 1 and when higher performance armor protection is required a ceramic strike face 2. The primary inductive power and data assembly 3 which would be encased in a plastic or resin housing, casting or other form of protective enclosure that is either non-conductive or non-magnetic and does not impede the transmission of inductive energy, is connected to the vehicle power and data system such as a CAN-BUS via a cable 4 and is bonded to the composite panel with an appropriate adhesive 5. Within the primary coil assembly 3 is located the primary inductive power coil 6 which for enhanced inductive coupling with the secondary inductive power coil 12 may include a ferrite backing 7. For the primary coil assembly to maintain as low a profile as possible, a typical geometry for the primary and secondary coils and ferrite backing is a planar or ring style of coil, however other geometries of coil such as square, elliptical, triangular et cetera can also be employed depending on the geometry of mounting space available. The coil must be of a size or diameter that allows it to fit within the device and also allow it to a develop a magnetic field with dimensions sufficient to penetrate the thickness of the armor panel with acceptable levels of coupling. Also located within the primary coil assembly is the primary data coil 8 shown also as a planar coil. The data coil may also have a ferrite backing (not shown in the illustration) to enhance inductive coupling between the primary and secondary data coils or may be of an entirely different configuration than the inductive power coils. There are many possible iterations of data coil configuration. For example the data coil could be a single ferrite rod with coil or, two ferrite rods with coils, with the two rods placed at 90 degrees to each other and geometrically similar data coil configuration in the secondary inductive coil assembly 10. Although not absolutely necessary for the inductive transmission system to function, optimal operation and the highest efficiency of power transfer is obtained when the primary inductive assembly 23 and secondary inductive assembly are placed on and aligned to a common axis 9. The secondary inductive coil assembly 10 would typically be incorporated into the base of an electrical or electronic device, although a stand-alone assembly can be used to which any device can be connected. The secondary inductive assembly 10 which is also constructed or encased in a plastic or resin housing, casting or other form of protective enclosure that is either non-conductive or non-magnetic and does not impede the transmission of inductive energy is shown bonded 11 to the ceramic strike face of the armor panel.

The secondary coil assembly is comprised of a secondary inductive data coil 14, and a secondary inductive power coil 12 which may have a ferrite backing 13 to improve coupling efficiency with the primary inductive power coil 6. The AC power received by the secondary power coil 12 and the modulated inductive waveform received by the secondary data coil 14 are received by the secondary conditioning electronics (not shown) via a connecting cable 15 that would typically be internal to the electronic or electrical device. If the device to be powered only requires electrical power, then the data coil can either be omitted from the configuration or simply not used.

The attachment and provision of inductive power and data to an electronic or electrical device on the exterior of a composite-ceramic armor panel provides many advantages. Principle amongst these advantages is that the device can be attached without having to make holes in the outer appliqué armor, for the passage of cables and connectors to the vehicle power and data system. In addition the device can be attached quickly and simply as no wires, cables or connectors are required which also allows the device to be completely sealed. As the device is sealed it is environmentally rugged and unaffected by sand, dirt, snow, ice. It can also be completely submerged in water and remain fully operational as the transmission of inductive power and data can be accomplished through water.

Figure 2:
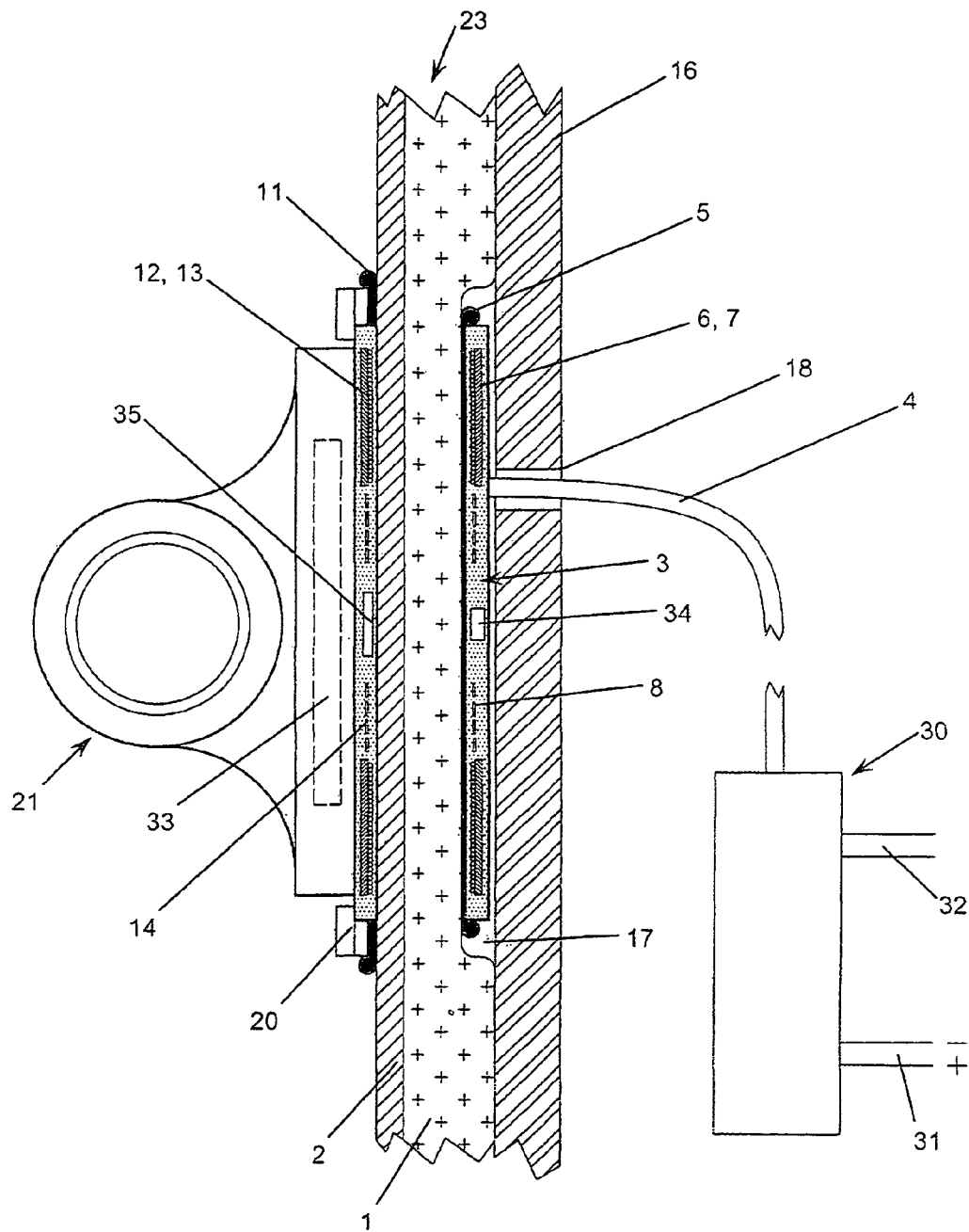
FIG. 2 is a partial cut-away view showing vehicle hull and attached armor panel primary inductive power and data coil assembly set into a recess in the composite panel assembly and the secondary inductive power and data coil assembly and circuit embedded within device mounted on the exterior strike face of the armor panel. The device which is completely self-contained with the secondary inductive power and data circuits is mounted onto a fixture on the armor panel which allows it to be easily and quickly installed or removed without connection of wires or cables.

The application of an electronic or electrical device 21 attached to the outside of a vehicles armor panel is shown in FIG. 2. Both vehicle DC power 31 and communications data from the vehicle data network 32 are provided to the primary power and data drive electronics 30. A port 18 in the vehicle hull 16 allows the passage of a shielded cable 4 from the primary drive electronics to the primary coil assembly 3. The primary drive electronics can be mounted on either the inside or outside of the vehicle hull 16 whichever is the most convenient. The primary inductive assembly contains within it, the primary power coil 6 and ferrite backing 7, the primary inductive data coil 8 and depending on design options implemented, a proximity sensor 34 such as a hall effect sensor. The hall effects sensor is used to determine if a secondary device has been attached on the outside of the hull that is equipped with for example a magnet 35 to trigger the hall effect sensor to indicate the presence of the device and allow main power to the inductive drive circuit to be turned on. Other sensing protocols may also be used instead of, or in conjunction with the proximity sensor such as inductive polling or pinging to determine if a secondary circuit has been place on the mounting point. The primary coil assembly 3 is bonded 5 within a recess 17 in the composite backing 1 of the armor panel, allowing the armor panel to be mounted flush against the vehicle hull 16. A device 21 is shown mounted on the exterior ceramic strike face 2 of the armor panel 23. When the device is to be energized, power is provided to the primary inductive circuits, presence of the device is detected and the primary inductive drive is turned on. Magnetic flux produced by the primary power coil 6 inductively connects with the inductive secondary coil 12 with ferrite backing 13 through the armor panel assembly 23. If the device is for example a running light, then only power is provided to the light, however if the device such as a video camera, requires a data communication link to operate, then an inductive data link is provided by the inductive coupling between the primary data coil 8 and the secondary inductive data coil 14. The power and data that is received inductively by the device must be processed or conditioned by the secondary electronics 33. In the case of power, the AC output of the secondary coil is rectified and then passed to a voltage regulator that provides the required voltage to the device. If a dedicated device data transmission channel is required that is separate from device control, then control signals can be sent either by a separate inductive data circuit or over the inductive power circuit. The device can be semi-permanently bonded directly onto the ceramic strike face or it can be mounted using a universal twist lock mounting fixture 20 that is permanently bonded 11 on to the ceramic armor component. The mounting fixture allows the device to be easily attached and removed without tools. If preferred the device can also be attached to the mounting fixture with fasteners such as threaded fasteners, cam locks and other mechanical means. Likewise, if preferred, the primary circuit can be mounted to the panel using a mounting fixture bonded onto the composite armor backing material.

Figure 3A:
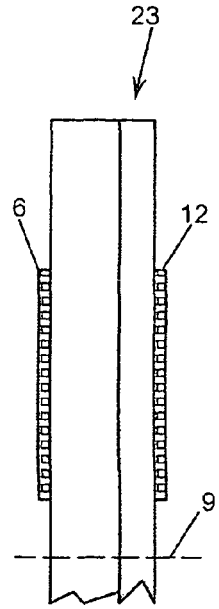
FIGS. 3A-3H show that the primary and secondary coil ferrite backing can be of many different geometries such as a thin flat annular disc with different inner and outer diameters, solid planar discs and three sided housings. Many iterations of backing can be conceived that all have the similar effect of providing an improved path for the magnetic flux versus that of an air backed coil.
Figure 3B:
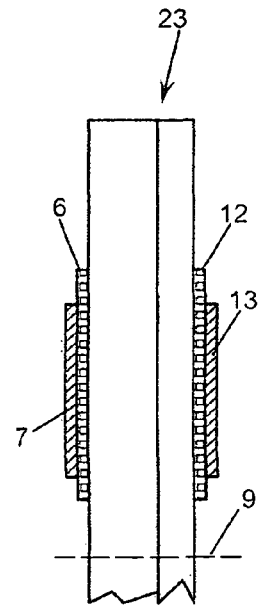
Figure 3C:
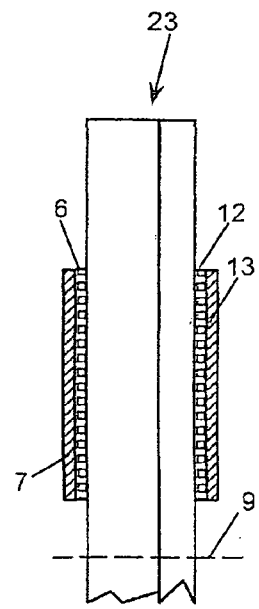
Figure 3D:
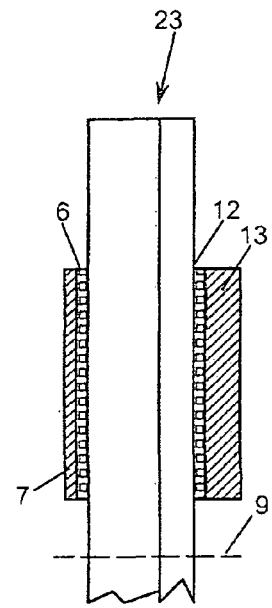
Figure 3E:
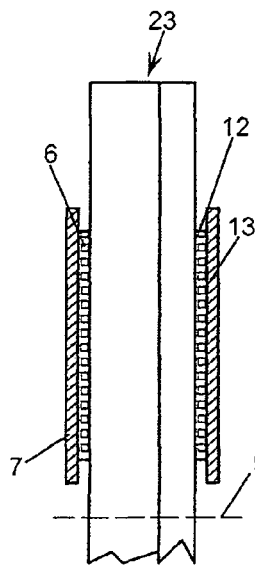
Figure 3F:
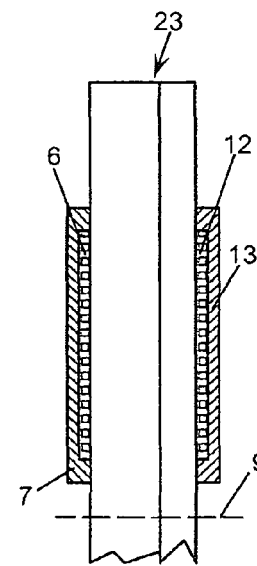
Figure 3G:
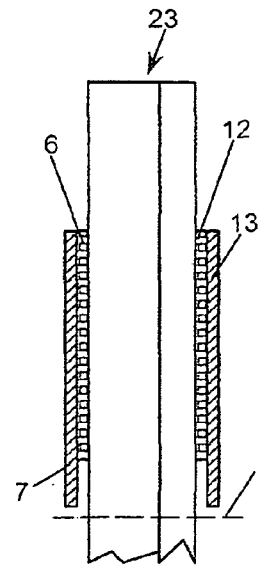
Figure 3H:
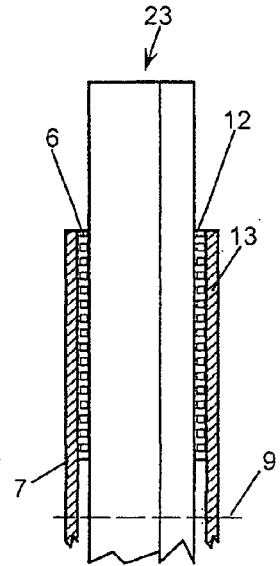
Figure 4A:
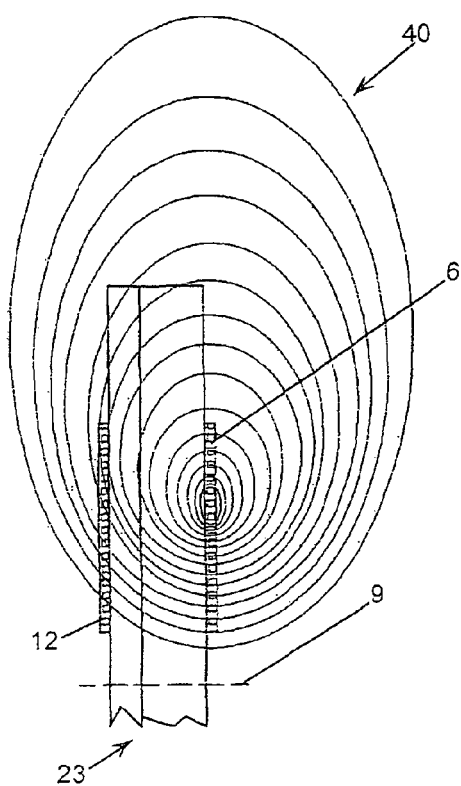
FIGS. 4A and 4B are cross-sections of part of an air backed primary and secondary planar inductive coils (FIG. 4A) and a ferrite backed primary and secondary inductive coils (FIG. 4B) showing the magnetic flux lines produced by placing a current through the primary inductive coil. The air backed coil has a much lower coupling efficiency than the ferrite coil due to the high level of flux leakage (magnetic flux lines whose path is outside the useful or intended magnetic circuit), where magnetic flux generated in the primary coil does not pass through the secondary coil. The ferrite backed inductive coils have more magnetic flux lines passing through both coils and significantly lower flux leakage and therefore a higher coupling efficiency.
Figure 4B:
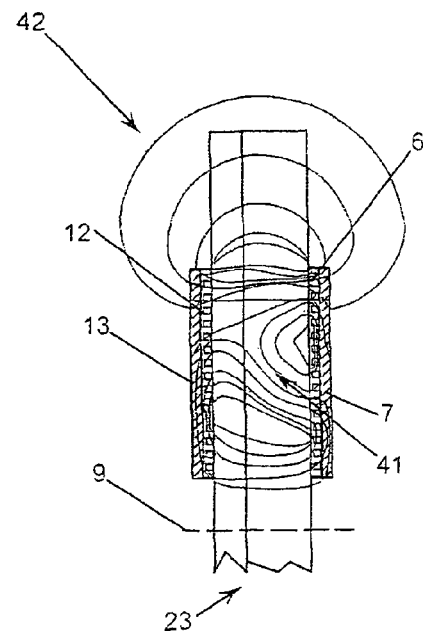

Inductive power can be transferred between coupled coils that can be arranged in multiple, physical configurations. As a preferred option for a low profile assembly, various configurations for a thin pancake style or planar coil configurations are illustrated in FIGS. 3A-3H. To provide greater clarity, the environmental encapsulation or outer case of the coil assemblies is not shown and only one half of the circular coil cross-section is shown. In its most basic configuration, a planar primary power coil 6 or winding is placed on the back side or composite side of the armor panel assembly 23 and the secondary inductive coil 12 is placed on the ceramic side. The coils can be fabricated from conventional magnet wire, be constructed from Litz wire, and be single or multi-layer PCB coils or other coil constructs. The coupling co-efficient of the planar coils is at its greatest when they are placed on a common axis 9, and are backed by ferrites. FIGS. 4A and 4B provide an illustration of the magnetic field attributes provided by ferrite backing plates. In the most basic application FIG. 3A, air-backed coils are placed on either side of the armor panel. In FIG. 3B a thin ferrite backing 7, 13 is applied to both primary and secondary coils which that have a larger outside diameter and smaller inside diameter than the ferrite backing. In FIG. 3C the thin ferrite backing has an ID and OD equal to that of the primary and secondary coils, while in FIG. 3D the thin ferrite on the secondary coils has been replaced by the a thick ferrite. As the ferrite shape is modified, so does the effective manipulation of the magnetic field accordingly, the ferrite shape can be chosen to obtain a desired shape of magnetic field. For power applications, maximum power transfer or an optimized coefficient of coupling is the usual requirement. For a data coil assembly, compensation for an offset between the primary and secondary coils may be required. FIG. 3D shows thin ferrites with both a larger ID and OD, while FIG. 3F demonstrates the application of a ferrite with a channel profile. FIG. 3G shows a ferrite with a small aperture in the center and in FIG. 3H the ferrite is a solid disc on the top of the coil ring.

Any configuration of ferrite can be applied to either the primary or secondary side independent of the other.

The effect on the magnetic flux created by the application of a ferrite backing to a planar coil assembly, is shown in FIG. 4B. FIG. 4A shows the representative magnetic field 40 when the primary coil 6 is energized with an alternating current. The primary coil 6 and secondary coil 12 are shown placed against a composite-ceramic armor panel 23 on a common axis 9, however because the composite and ceramic armor components have no magnetic or conductive properties, the magnetic field lines are modeled as if the coils were separated by an air gap. If we now place a planar ferrite backing 7 on the primary coil 6 and a ferrite backing 13 on the secondary coil 12 as shown in FIG. 4B, the coils become more tightly coupled magnetically and have a greater inductive coupling. Now the magnetic field from the primary coil that previously radiated freely into air, is directed such that the magnetic flux lines become concentrated 41 between the two coils with only a small part of stray inductive energy 42 escaping from the outside diameter.

Figure 5A:
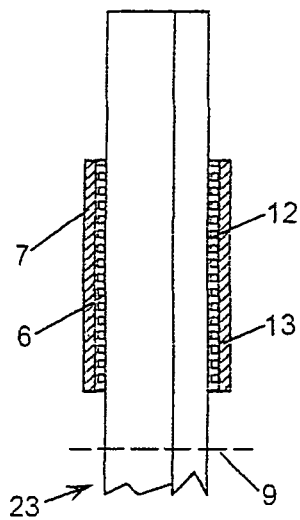
FIGS. 5A-5E show that multiple configurations are available for the geometry of the inductive data coil and the position of the data coil relative to the inductive power coil. The data coil can be of a different wire or material than the inductive power coil.
Figure 5B:
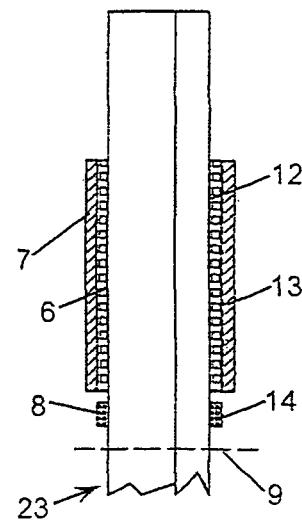
Figure 5C:
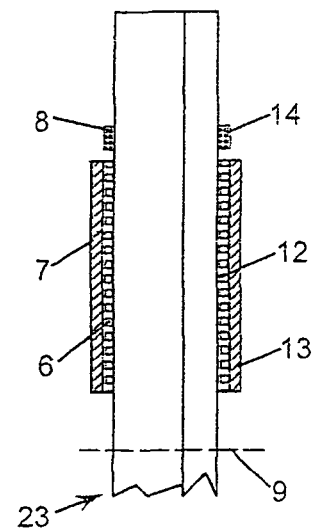
Figure 5D:
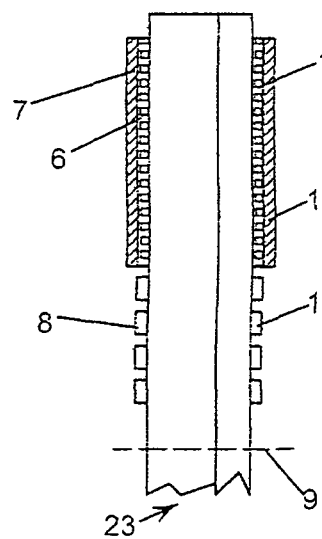
Figure 5E:
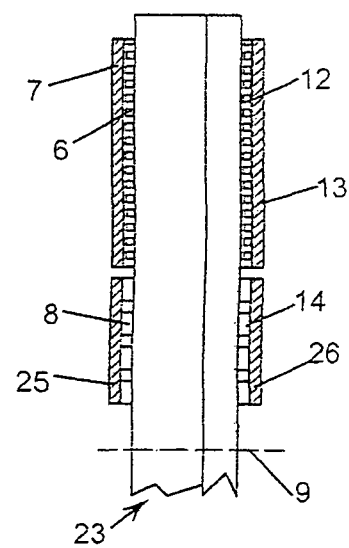

The inductive power and data coils can be configured and be mechanically and electronically integrated in many configurations some of which are shown in FIGS. 5A-5E. In FIG. 5A a primary coil 6 and ferrite backing 7 is positioned with a common central axis 9 on a composite-ceramic armor panel 23 with a secondary coil 12 with ferrite backing 13. In this application both inductive power and data utilize the same primary and secondary coils, with the data impressed upon the coil by modulating the driven frequency of the primary coil. The ferrite backing is shown as a simple thin backing however it can have the form of many geometries depending on the nature of the application. In FIG. 5B the primary inductive power coil 6 and a ferrite backing 7 and inductive data coil 8 placed on the inside diameter of the power coil are physically different windings connected to different control circuits, with only the power coil backed by ferrite. The winding geometry and construction of the data coil is entirely different from the power coil. Similarly on the secondary side the secondary data coil 14 is located on the inside diameter of the power coil 12, the ferrite backing 13 only covers the power coil. Another iteration shown is with the data coil on the outside diameter of the power coil in FIG. 5C. FIG. 5D shows the data coil in an air backed configuration and represented as a PCB etched coil or coil printed on a Mylar substrate. The wound power coil would be operated at a frequency of for example 220 kHz and the PCB data coil located on the inner diameter at 13.56 MHz, using separate drive circuits. FIG. 5E shows the addition of a ferrite backing to each of the inductive primary power coil 7, the secondary power coil 13 and, the inductive primary data coil 25, and the secondary data coil 26.

As the power and data coils operate at significantly different frequencies, the composition and permeability of the ferrite backing will be different and is selected to best suit the resonant frequency of each coil tank circuit.

Figure 6:
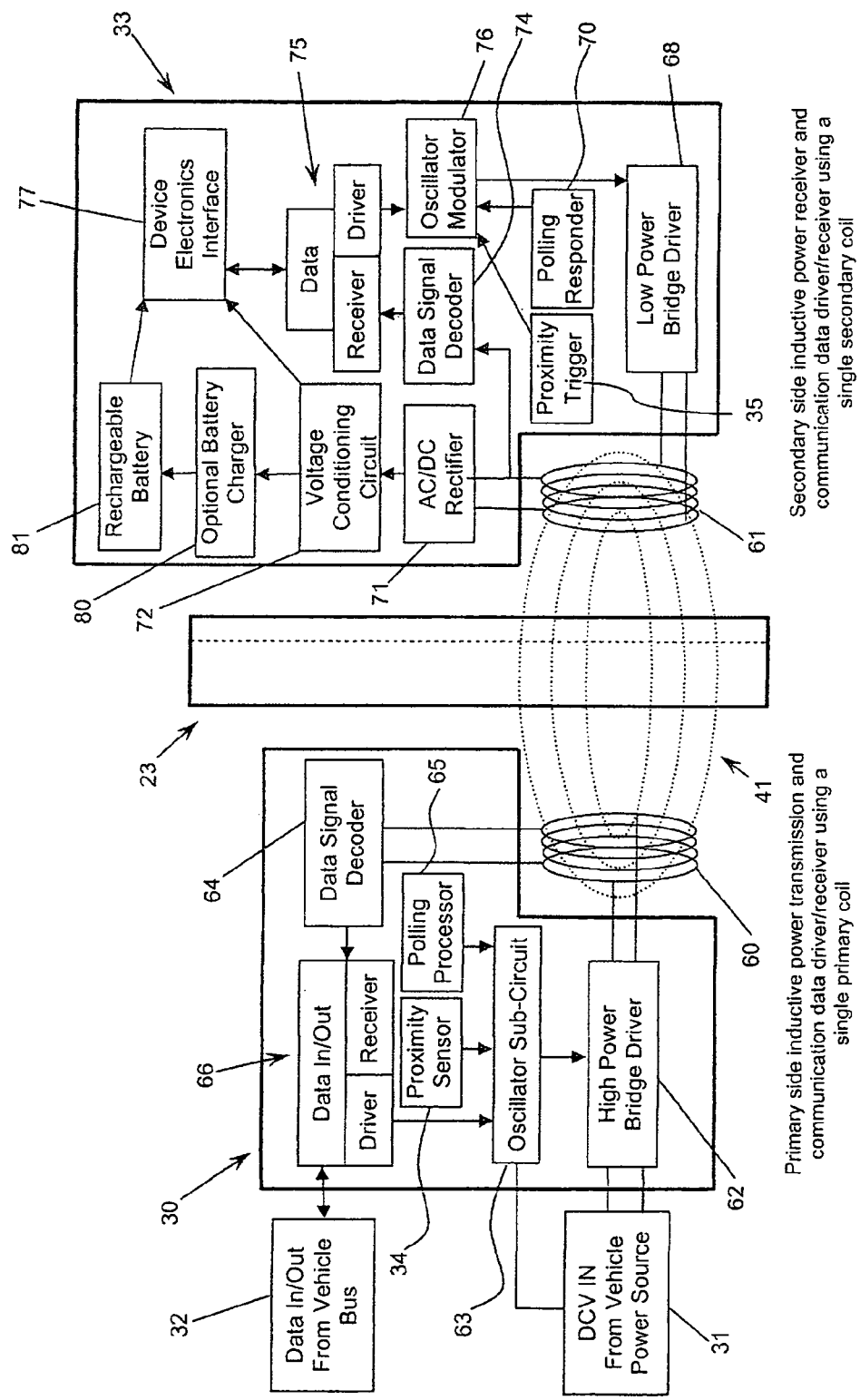
FIG. 6 is a simplified schematic block diagram showing inductive power and data transfer using a single coil on each of the primary and secondary sides.

A schematic block diagram of an inductive power and data transmission system is presented in FIG. 6.

DC voltage from the vehicle 31, usually within the range of but not limited to 10-48 VDC, is provided to the primary drive electronic circuit 30, that can be located either within or external to the vehicle and in a variety of enclosure types. There are many inductive drive circuits employing both conventional and new circuit topologies that can be used as the principle drive elements for the inductive power circuit. Circuit blocks are usually comprised of an oscillator circuit 63 that can contain within it an auto-tune sub circuit, the oscillator circuit then feeding the drive frequency into the main drive circuit that may be a half or full bridge driver 62 or other switching circuit that allows an alternating current to be provided to the tuned tank circuit comprised of the primary power coil 60 and tuning capacitors. Vehicle power 31 to the primary driver can be switched manually within the vehicle and optionally the circuit can also contain sensing circuits that only allow full power to the tank circuit if a device is mounted on the outside of the armor panel 23. Once the primary inductive coil is activated, a magnetic flux field 41 is generated that passes through the armor panel 23 and inductively connects with the secondary inductive power coil 61. Example devices are a proximity sensor 34 such as a hall effect sensor that would be switched by the presence of a proximity trigger 35 such as a magnet embedded within the device mounted on the exterior of the vehicle. Other methods of determining the presence of a secondary inductive circuit include a polling processor 65 in the primary circuit polling or pinging to determine if it is present. If the device has no temporary internal power source such a rechargeable battery, the device must be powered up inductively so that it can respond that it is there. When polling for a device therefore, the main power to the primary drive circuit must be turned on for a length of time sufficient to allow the device to respond back to the poll emitted by the primary. In addition to periodic polling, the same modulation technique can be used to for limited data transfer using the modulated magnetic flux 41 between the primary 60 and secondary 61 inductive power coils. By using a dedicated interface driver-receiver circuit 66, data signals superimposed on the power signal can be decoded 64 for communication purposes with the vehicle data bus 32. Applications of this low level of data transfer are intended more for switching an operation mode of a device or very low levels of data transfer that indicate status or a sensors reading level.

When the secondary inductive power and data circuit 33 is placed on its mounting place on the outside of the armor panel 23 and power is applied to the primary circuit, the secondary circuit is sensed either by the proximity sensor being triggered by the device or by the devices polling responder 70 replying to a polling request. The secondary side of the inductive power and data transmission system is comprised of a secondary power and data receiving coil 61, which may or may not be in a series or parallel tuned circuit. The AC inductive power received by the secondary coil 61 is rectified to DC power 71 and then changed to the appropriate voltage of the device by a voltage regulator circuit 72 before power is passed to the device interface electronics 77. If required, a rechargeable battery 81 and battery charging circuit 80 can be included with the secondary electronics. Any encoded and modulated data received by the secondary is detected and processed by decoder 74 and data processor 75 before going to the external device. Low level data streams for example, less than 20 KBPs can be fed back from the device through the data driver 75, to the oscillator/modulator block 76, low power bridge driver 68 or equivalent switching circuit topology and then to the secondary coil 61 that provides inductive transmission 41 to the primary coil 60.

The above discussion was not intended to be limiting as there are multiple ways to implement variations of the above circuit, from the most rudimentary where the primary circuit is turned on and runs at full power regardless of the presence of a device, to more sophisticated implementations of modulated data over power.

Figure 7:
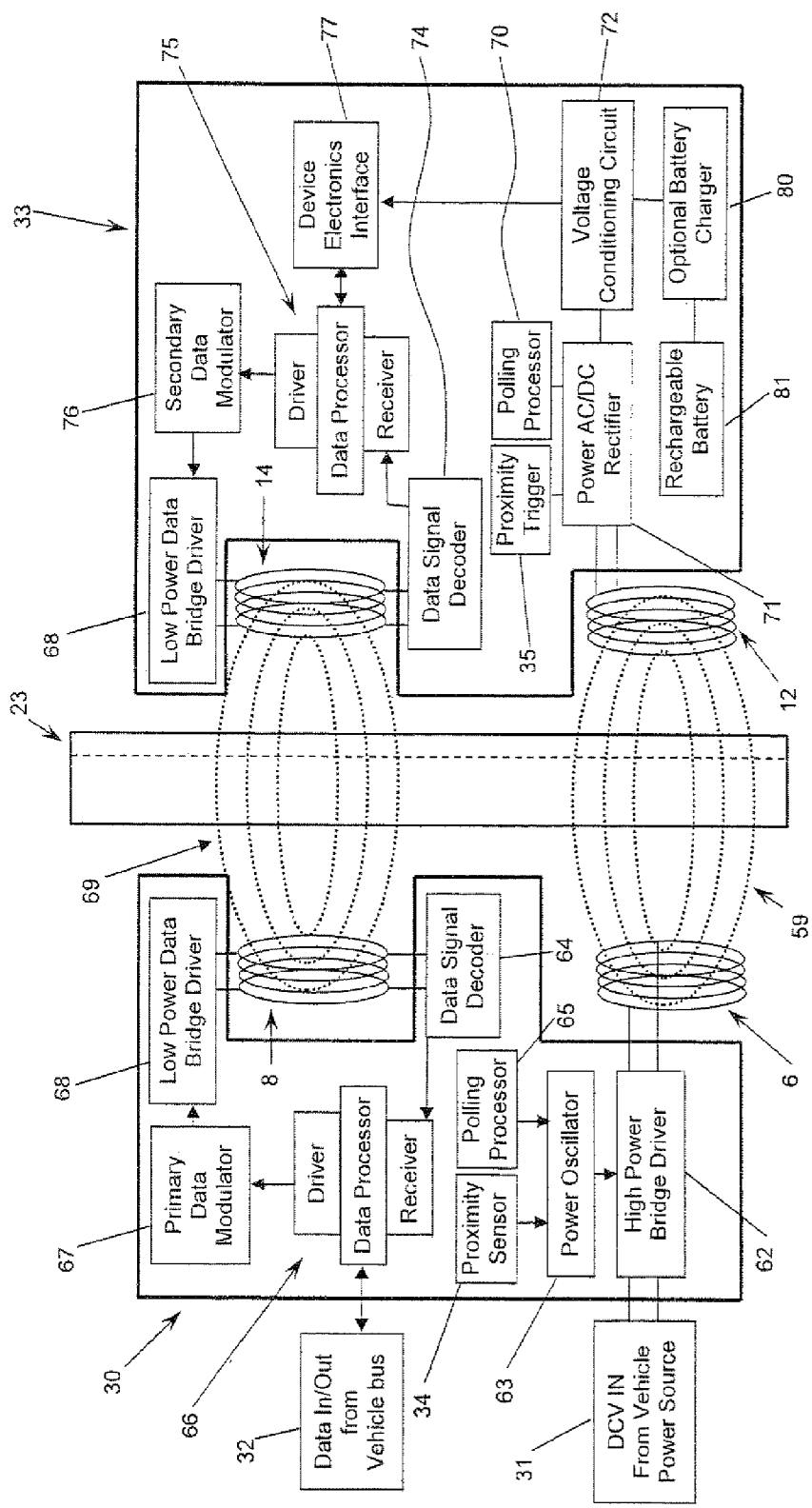
FIG. 7 is a simplified schematic block diagram showing inductive power and data transfer using separate coils for power and data transmission on each of the primary and secondary sides.

FIG. 7 shows a schematic block diagram of an inductive power and data transmission system where the inductive power and inductive data are transmitted over dedicated power and data primary and secondary inductive coils. DC voltage from the vehicle 31, usually within the range of but not limited to 10-48 VDC, is provided to the primary drive electronic circuit 30, that can be located either within or external to the vehicle and in a variety of enclosure types. There are many inductive drive circuits employing both conventional and new circuit topologies that can be used as principle drive elements for the inductive power circuit. Base blocks are usually comprised of an oscillator circuit 63 that can contain within them an auto-tune sub circuit, the oscillator circuit then feeding the drive frequency into the main drive circuit that may be a half or full bridge driver 62 or other switching circuit that allows an alternating current to be provided to the tuned tank circuit comprised of the primary power coil 6 and tuning capacitors. Vehicle power 31 to the primary driver can be switched manually within the vehicle and optionally the circuit can also contain sensing sub-circuits that only allow full power to the tank circuit if a device is mounted on the outside of the armor panel 23. Once the primary inductive coil is activated a magnetic flux field 59 is generated that passes through the armor panel 23 and inductively connects with the secondary inductive power coil 12.

As described for the data over power inductive circuit, the presence of the secondary circuit can be sensed by the primary circuit using proximity sensors 34 such as a hall effect sensor in the primary and a sensor trigger 35 or for a hall effect sensor, a magnet located within the base plate of the external device or, a polling process can be implanted that employs a polling processor 65 in the primary drive with a respondent polling processor 70 in the secondary. Alternately, with a system utilizing separate inductive power and data transmission circuits, the NFC inductive data system can perform a handshake identification of the secondary device that allows the continuous provision of power to the primary circuit and consequently to the secondary circuit within the device, but also initiates the ability of the NFC system to communicate data. If the device has no temporary internal power source such a rechargeable battery, the device must momentarily be powered up inductively so that it can respond that it is present. When polling for a device therefore, the main power to the primary drive circuit must be turned on for a length of time sufficient to allow the device to respond back to the poll emitted by the primary.

When the secondary circuit is placed on its mounting place on the outside of the armor panel 23, when power is applied to the primary circuit, the secondary circuit may be sensed either by the proximity sensor being triggered by the device, by the device responding to a polling request or by NFC data exchange. Once it is established that the device is present and the primary power circuit is energized, the secondary side of the inductive power transmission system comprised of the secondary inductive power coil 12, which may or may not be in a series or parallel tuned circuit begins to receive continuous power. The AC inductive power received by the inductive secondary coil 12 is rectified to DC power 71 and then changed to the appropriate voltage of the device by a voltage regulator circuit 72 before power is passed to the device electronics interface 77. Optionally power can also be provided to a battery recharging circuit 80 and rechargeable battery 81 integrated within the device.

The data circuit functions as a separate entity from the power circuit except for polling requests that may be made between them. Data inputs from the vehicle bus 32 and data outputs from the primary drive circuit 30 are received by the inductive data processor block 66, which as previously discussed can be an architecture such as NFC. The processor block 66 encodes the data which is then modulated 67 and passed to a low power data bridge driver 68 that transmits the data inductively via the primary data coil or antenna 8 via the magnetic field 69 that communicates through the armor panel 23 with the secondary inductive data coil or antenna 14. The data is received by a data signal decoder 74, converted and processed 75 before being transferred to the external device interface electronics 77 on a peer to peer basis. This architecture will allow half duplex data rate exchanges of up to 848 kbps with first generation commercial devices and up to 6.78 MBps with second generation devices. The return of data from the device to the vehicle follows the reverse process. Data from the device interface electronics 77 are passed to the inductive data processor block 75, which encodes and modulates 76 the NFC signal and generates the magnetic field using for example a low power data bridge driver 68 transmitting the data inductively via the secondary data coil or antenna 14 via the magnetic field 69 that communicates through the armor panel 23 with the primary inductive data coil or antenna 8. The data is received by a data signal decoder 64, converted and processed 66 before being transferred to the vehicle data bus 32 on a peer to peer basis.

The design and function of some external devices may require separate transmission data and control channels. In this case two data circuits and respective coil assemblies can be incorporated into the primary drive circuit and external device. To ensure there is no cross-talk or interference between data channels the data streams can be encoded, modulated differently, use a different operating frequency or be separated sufficient physically that the two magnetic data fields can operate without interference.

Figure 8:
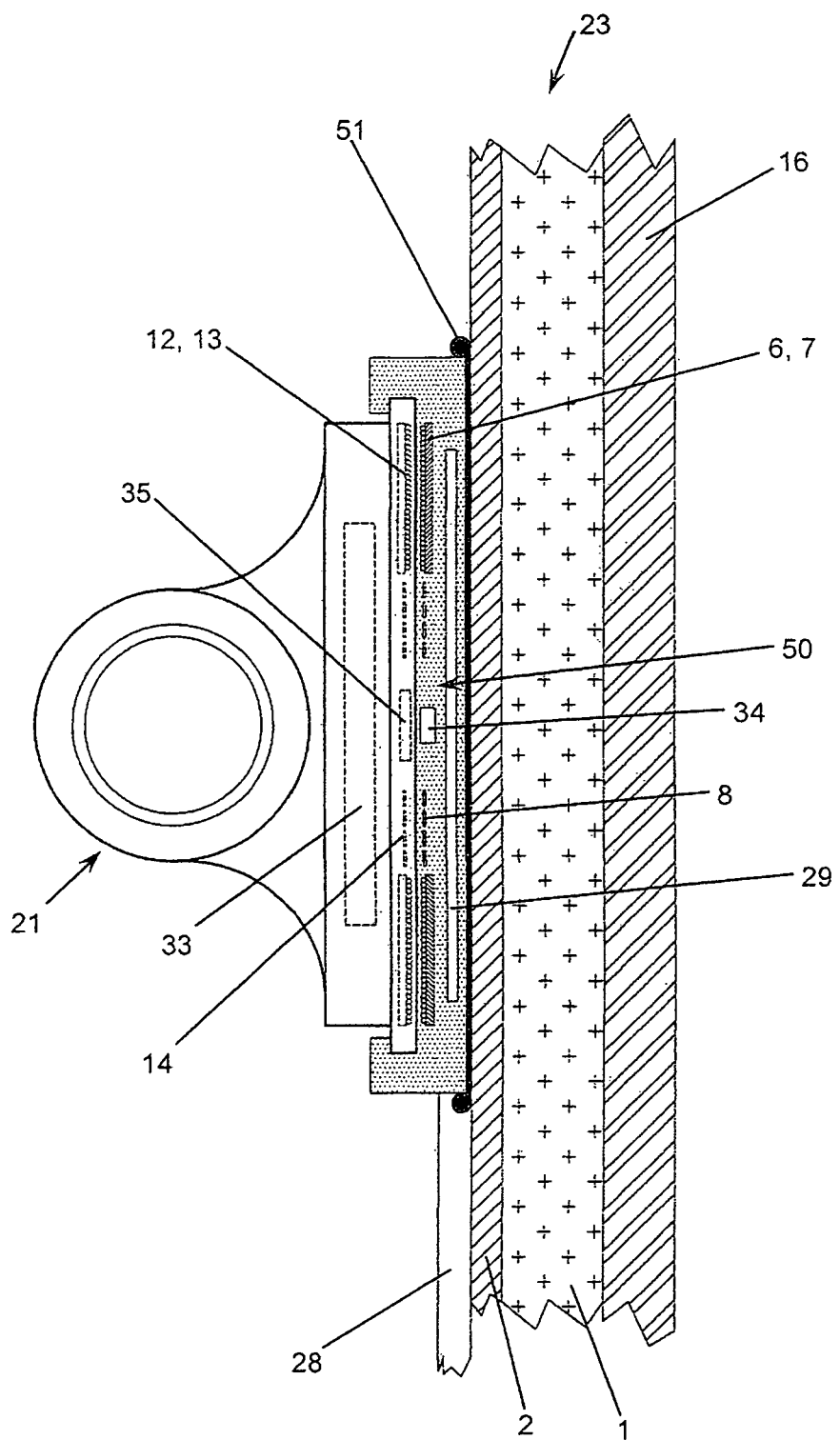
FIG. 8 is a partial cut-away view showing vehicle hull and attached armor panel with a primary inductive power and data coil assembly embedded into a mounting fixture that is bonded to the strike face of the armor. The device which is completely self-contained and contains the secondary inductive power and data circuits is mounted onto a fixture on the armor panel which allows it to be easily and quickly installed or removed without connection of wires or cables. A benefit of an external mounted primary inductive drive assembly is that it can be mounted on a metal or conductive armor system such as aluminum or hardened steel without the metal armor effecting the inductive transmission properties.

The further application of an electronic or electrical device 21 attached to the outside of a vehicle's armor panel is shown in FIG. 8. In some instances it may be possible to bring a power and data cable to the strike face of the armor without compromising the protection of the vehicle. This would allow the primary inductive power and data circuits and their respective inductive coils to be placed on the strike face of both ceramic composite armor systems 23 used as appliqué on a metal vehicle hull 16 as well as all metal armor systems. Both the electronic device and the mounting fixture with primary inductive power and data integrated into it, remain fully sealed retaining all the benefits of inductive power and data transmission. Vehicle DC power and communications data from the vehicle data network are provided to the primary power and data drive electronics 29 via an external cable 28. The primary drive electronics assembly 29 are embedded within the mounting fixture 50. The mounting fixture allows the device to be easily attached and removed without tools. If preferred the device can also be attached to the mounting fixture with fasteners such as threaded fasteners, cam locks and other mechanical means. The primary inductive drive assembly contains the primary power coil 6 and ferrite backing 7, the primary inductive data coil 8, the primary power and data drive electronics 29 and depending on design options implemented, a proximity sensor 34 such as a hall effect sensor. The hall effects sensor is used to determine if a secondary device has been attached on the outside of the hull that is equipped with for example a magnet 35 to trigger the hall effect sensor to indicate the presence of the device and allow main power to the inductive drive circuit to be turned on. Other sensing protocols may also be used instead of, or in conjunction with the proximity sensor such as inductive polling or pinging to determine if a secondary circuit has been place on the mounting point. The mounting fixture with embedded primary drive circuits is bonded 51 to the strike face of the ceramic composite armor panel or directly to the metal vehicle hull 16. A device 21 is shown mounted on the exterior ceramic strike face 2 of the armor panel 23. When the device is to be energized, power is provided to the primary inductive circuits, presence of the device is detected and the primary inductive drive is turned on. Magnetic flux produced by the primary power coil 6 inductively connects with the inductive secondary coil 12 with ferrite backing 13. If the device is for example a running light, then only power is provided to the light, however if the device such as a video camera, requires a data communication link to operate, then an inductive data link is provided by the inductive coupling between the primary data coil 8 and the secondary inductive data coil 14. The power and data that is received inductively by the device must be processed or conditioned by the secondary electronics 33. In the case of power, the AC output of the secondary coil is rectified and then passed to a voltage regulator that provides the required voltage to the device. If a dedicated device data transmission channel is required that is separate from device control, then control signals can be sent either by a separate inductive data circuit or over the inductive power circuit.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for inductive transmission of power and data through large caliber ballistic appliqué composite armor panels mountable to military vehicles, the system comprising:
    a large caliber ballistic appliqué composite armor panel having opposite inner and outer faces defining an armor thickness therebetween, wherein, when said panel is mounted to the vehicle, said inner face is disposed towards the vehicle and said outer face is disposed outwards of the vehicle, wherein a quick-release base is mounted to said outer face, and a primary coil is mounted to said inner face so as to be opposite to and aligned with said base,
    a portable electrical device having a base end, and wherein a secondary coil is mounted in said base end, said secondary coil having a diameter, and wherein said armor thickness is no greater than substantially 50 percent of said diameter,
    wherein said base end of said portable electrical device is adapted to releasably mount onto said quick release base for power transfer to said electrical device and for data transfer between said primary coil and said secondary coil by inductive coupling between said primary and secondary coils,
    and wherein primary and secondary circuitry associated with said primary and secondary coils is mounted, respectively, so as to cooperate with said primary and secondary coils,
    and wherein said power is supplied by an electrical system of the vehicle and said data is transferred between said electrical device and the vehicle via said inductive coupling.

2. The system of claim 1 wherein each said primary coil is a single coil for both said transfer of power and data.

3. The system of claim 1 wherein each said primary coil is a pair of coils wherein one coil of said pair is for said transfer of power and the other coil of said pair is for said transfer of data at a high data rate.

4. The system of claim 2 wherein a plurality of said each primary coil are distributed over said inner face and wherein said each primary coil is electrically connected in cooperation with said primary circuitry.

5. The system of claim 3 wherein a plurality of said each primary coil are distributed over said inner face and wherein said each primary coil is electrically connected in cooperation with said primary circuitry.

6. The system of claim 1 wherein said quick release base is adapted and sized to snugly receive said base end of said electrical device therein for secure positioning of said secondary coil in an inductively coupling position aligned with said primary coil.

7. The system of claim 6 wherein said primary coil is a plurality of primary coils which include power and data nodes.

8. The system of claim 6 wherein said primary coil is a plurality of primary coils and said quick release base includes a plurality of quick release bases mounted on said outer surface of said armor panel.

9. The system of claim 8 further comprising a vehicle power supply from the vehicle, wherein said vehicle power supply is in electrical connection to said primary circuitry.

10. The system of claim 1 wherein said primary coil has a diameter which is substantially the same as said diameter of said secondary coil.

11. The system of claim 10 wherein said primary coil and said quick release base are a corresponding plurality of pairs of said primary coils and said quick release bases.

12. The system of claim 9 further comprising a network which includes said vehicle power supply on the vehicle, wherein said primary circuitry has a hard-wired connection to said network for the exchange of power and data between said primary circuitry and said network.

13. The system of claim 1 wherein each said electrical device has its own re-chargeable power supply which is charged by said inductive transfer of power.

14. The system of claim 1 further comprising a proximity sensor in said quick release base to detect proximity of said electrical device in said base.

15. The system of claim 13 wherein said each electrical device provides a modulated signal via said inductive coupling of said primary and secondary coils for said transfer of data.

16. The system of claim 15 wherein said signal is transmitted via a modulated signal inductively transmitted through an inductively coupled power coupling of said primary and secondary coils.

17. The system of claim 15 wherein said signal is transmitted via a modulated signal inductively transmitted through an inductively coupled data coupling of said primary and secondary coils.

18. The system of claim 1 wherein said coils are the substantially planar coils.

19. A system for inductive transmission of power and data through large caliber ballistic appliqué composite armor panels mountable to military vehicles, the system comprising:
- a large caliber ballistic appliqué composite armor panel having opposite inner and outer faces defining an armor thickness therebetween, wherein, when said panel is mounted to the vehicle, said inner face is disposed towards the vehicle and said outer face is disposed outwards of the vehicle, wherein a quick-release base is mounted to said outer face, and a primary coil is mounted to said inner face so as to be opposite to and aligned with said base,
- a portable electrical device having a base end, and wherein a secondary coil is mounted in said base end, said secondary coil having a diameter, and wherein said armor thickness is no greater than substantially 40 percent of said diameter,
- wherein said base end of said portable electrical device is adapted to releasably mount onto said quick release base for power transfer to said electrical device and for data transfer between said primary coil and said secondary coil by inductive coupling between said primary and secondary coils,
- and wherein primary and secondary circuitry associated with said primary and secondary coils is mounted, respectively, so as to cooperate with said primary and secondary coils,
- and wherein said power is supplied by an electrical system of the vehicle and said data is transferred between said electrical device and the vehicle via said inductive coupling.

20. The system of claim 19 wherein each said primary coil is a single coil for both said transfer of power and data.

21. The system of claim 19 wherein each said primary coil is a pair of coils wherein one coil of said pair is for said transfer of power and the other coil of said pair is for said transfer of data at a high data rate.

22. The system of claim 20 wherein a plurality of said each primary coil are distributed over said inner face and wherein said each primary coil is electrically connected in cooperation with said primary circuitry.

23. The system of claim 21 wherein a plurality of said each primary coil are distributed over said inner face and wherein said each primary coil is electrically connected in cooperation with said primary circuitry.

24. The system of claim 19 wherein said quick release base is adapted and sized to snugly receive said base end of said electrical device therein for secure positioning of said secondary coil in an inductively coupling position aligned with said primary coil.

25. The system of claim 24 wherein said primary coil is a plurality of primary coils which include power and data nodes.

26. The system of claim 24 wherein said primary coil is a plurality of primary coils and said quick release base includes a plurality of quick release bases mounted on said outer surface of said armor panel.

27. The system of claim 26 further comprising a vehicle power supply from the vehicle, wherein said vehicle power supply is in electrical connection to said primary circuitry.

28. The system of claim 19 wherein said primary coil has a diameter which is substantially the same as said diameter of said secondary coil.

29. The system of claim 28 wherein said primary coil and said quick release base are a corresponding plurality of pairs of said primary coils and said quick release bases.

30. The system of claim 27 further comprising a network which includes said vehicle power supply on the vehicle, wherein said primary circuitry has a hard-wired connection to said network for the exchange of power and data between said primary circuitry and said network.

31. The system of claim 19 wherein each said electrical device has its own re-chargeable power supply which is charged by said inductive transfer of power.

32. The system of claim 19 further comprising a proximity sensor in said quick release base to detect proximity of said electrical device in said base.

33. The system of claim 31 wherein said each electrical device provides a modulated signal via said inductive coupling of said primary and secondary coils for said transfer of data.

34. The system of claim 33 wherein said signal is transmitted via a modulated signal inductively transmitted through an inductively coupled power coupling of said primary and secondary coils.

35. The system of claim 33 wherein said signal is transmitted via a modulated signal inductively transmitted through an inductively coupled data coupling of said primary and secondary coils.

36. The system of claim 19 wherein said coils are the substantially planar coils.

37. The system of claim 19 wherein said armor thickness is no greater than substantially 30 percent of said diameter.

* * * * *